US009648381B2

(12) United States Patent
Tyagi et al.

(10) Patent No.: US 9,648,381 B2
(45) Date of Patent: May 9, 2017

(54) METHOD AND SYSTEM FOR MANAGING DISPLAY OF WEB-BASED CONTENT ON PORTABLE COMMUNICATION DEVICES

(71) Applicant: MOBSTAC INC., New York, NY (US)

(72) Inventors: Shivansh Tyagi, Bangalore (IN); Ravi Pratap Maddimsetty, Bangalore (IN)

(73) Assignee: MOBSTAC INC., New York, NY (US)

( * ) Notice: Subject to any disclaimer, the term of this patent is extended or adjusted under 35 U.S.C. 154(b) by 0 days.

(21) Appl. No.: 14/495,852

(22) Filed: Sep. 24, 2014

(65) Prior Publication Data

US 2015/0089559 A1 Mar. 26, 2015

Related U.S. Application Data

(60) Provisional application No. 61/881,733, filed on Sep. 24, 2013, provisional application No. 61/881,755, filed on Sep. 24, 2013.

(51) Int. Cl.
| | |
|---|---|
| *H04N 21/435* | (2011.01) |
| *H04N 21/61* | (2011.01) |
| *H04N 21/462* | (2011.01) |
| *H04N 21/414* | (2011.01) |
| *G06F 17/30* | (2006.01) |

(52) U.S. Cl.
CPC ... *H04N 21/4358* (2013.01); *G06F 17/30905* (2013.01); *H04N 21/41407* (2013.01); *H04N 21/4355* (2013.01); *H04N 21/4622* (2013.01); *H04N 21/6125* (2013.01)

(58) Field of Classification Search
CPC ............ H04N 7/181; H04N 21/41407; H04N 21/4126; H04N 21/6125; H04N 21/47202
See application file for complete search history.

(56) References Cited

U.S. PATENT DOCUMENTS

| | | | | |
|---|---|---|---|---|
| 2006/0274869 | A1* | 12/2006 | Morse ............... | G06F 17/30905 375/352 |
| 2008/0139191 | A1* | 6/2008 | Melnyk ............. | G06F 17/30905 455/419 |
| 2012/0154386 | A1* | 6/2012 | Nagara .................. | G02B 27/26 345/419 |

* cited by examiner

*Primary Examiner* — Benjamin R Bruckart
*Assistant Examiner* — Aklil Tesfaye
(74) *Attorney, Agent, or Firm* — Symbus Law Group, LLC; Clifford D. Hyra (57) ABSTRACT

The present disclosure provides a method and system for managing display of web-based content on one or more portable communication devices. The method and system include a content acquisition module configured to acquire the web-based content from one or more web-based sources, a device detection module configured to determine a plurality of configuration parameters for each of the one or more portable communication devices, and a transformation module configured to transform the web-based content for each of the one or more portable communication devices based on the determined plurality of configuration parameters for each of the one or more portable communication devices. Each of the one more portable communication devices sends a request to the one or more web-based sources to access web-based content.

11 Claims, 5 Drawing Sheets

METHOD AND SYSTEM FOR MANAGING DISPLAY OF WEB-BASED CONTENT ON PORTABLE COMMUNICATION DEVICES

This application claims priority to U.S. Provisional Application Ser. No. 61/881,733 and U.S. Provisional Application Ser. No. 61/881,755, both filed Sep. 24, 2013, the contents of which are hereby incorporated by reference.

TECHNICAL FIELD

The present invention relates to the field of display of web-based content on mobile communication devices and, in particular, relates to managing display of web-based content on portable communication devices.

BACKGROUND

In this age of technological advancements, mobile computing devices, including mobile phones (e.g., smart phones) and tablet computers with/without touch screen displays, are being increasingly used for accessing web-based content. Owing to a large chunk of content consumption on these mobile computing devices, most of the content creators want the web-based content to be appropriately published on these mobile computing devices.

Most of the web-based content created for big screen devices like laptops and desktops are generally not suitable for viewing on the mobile computing devices. For example, websites increasingly using feed formats such as Really Simple Syndication (RSS) or Atom that provides users with frequently updated web content. Each of the web syndication formats follows a general structure comprising multiple items, where each of the items further comprises, for example, a link, a title, meta-data such as HyperText Markup Language (HTML), a brief description, etc. Generally, the HTML in the RSS feeds is not suitable for viewing on mobile devices such as, mobile phones, personal digital assistants (PDAs), tablets, etc.

In addition, most of the mobile computing devices have different configurations and capabilities. For example, the mobile computing devices have variations in display screens, processing power, memory, network speeds, keyboard functionality, etc. In order to be able to display the web content across different mobile computing devices with different capabilities and configurations, the web content is transformed for each type of mobile computing device.

Conventional methods for transforming a web page comprising the web content include applying transformations at individual page levels, dropping elements and modifying the web page based on pre-defined rules. However, this approach results in rewriting applications for various browsers, markup languages and device types, storing large code bases and acquiring design expertise at least for popular mobile computing devices. Hence, there is a need for storing the web content in a way that allows the mobile device output to be varied for each request.

Further, most of these mobile computing devices have an elongated rectangular display screen for displaying web content. The display screen of the mobile device can be oriented in more than one way with respect to a user viewing the content. In such mobile devices, when a user attempts to rotate the mobile computing device, the content on the display screen is usually reoriented so as to correspond with the viewpoint of the user. For example, the display screen may be oriented in a vertically-oriented position (portrait orientation) or a horizontally-oriented position. In the portrait orientation, the display screen accommodates more content than in the landscape orientation. Therefore, while presenting the content on the display screen, particularly the audiovisual content, the content has to automatically be formatted and restructured when the mobile computing device is reoriented from a landscape orientation to a portrait orientation or vice versa.

Conventional methods for restructuring audiovisual content of the web pages on a mobile device include momentarily pausing streaming of the audiovisual content and removing the audiovisual content represented in a tree structure, for example, Document Object Model (DOM) on detecting a change in orientation of the mobile device and re-rendering the audiovisual content after restructuring the web page based on attributes of the new orientation. However, this method does not allow an uninterrupted play of the audiovisual content as the streaming is stopped momentarily. Further, repeated streaming of the audiovisual content in different orientations of the mobile device leads to increased consumption of internet bandwidth.

In light of the above stated discussion, there is a need for a method and system which overcomes the above stated drawbacks in efficient management of display of web-based content on mobile computing devices.

SUMMARY

In as aspect of the present disclosure, a system for managing display of web-based content on one or more portable communication devices is provided. The system includes a content acquisition module configured to acquire the web-based content from one or more web-based sources, a device detection module configured to determine a plurality of configuration parameters for each of the one or more portable communication devices, and a transformation module configured to transform the web-based content for each of the one or more portable communication devices based on the determined plurality of configuration parameters for each of the one or more portable communication devices. Each of the one more portable communication devices sends a request to the one or more web-based sources to access web-based content.

In an embodiment of the present disclosure, each of the one or more portable communication devices is configured to acquire the web-based content comprising the audiovisual content. The web-based content is formatted for one of a first orientation and a second orientation on a display screen of each of the one or more portable communication devices. Each of the one or more portable communication devices is configured to represent the audiovisual content of the web-based content in a tree structure and determine page information for the first orientation and the second orientation of the display screen for the web-based content, restructure the audiovisual content on detecting a change in orientation from one of the first orientation to the second orientation and from the second orientation to the first orientation based on the determined page information and display the restructured audiovisual content. The page information comprises types of content in the web-based content and location of the audiovisual content in the tree structure.

In an embodiment of the present disclosure, the location of the audiovisual content in the tree structure is retained on restructuring the audiovisual content for providing an uninterrupted display of the audiovisual content on the corresponding display screen of each of the one or more portable communication devices.

In an embodiment of the present disclosure, the content acquisition module configured to acquire the web-based content from one or more web-based sources comprises acquiring metadata of the web-based content.

In an embodiment of the present disclosure, the transformation module is configured to apply a one-time transformation on the HTML tags for converting the HTML tags into custom tags.

In another aspect of the present disclosure, the system includes a rendering platform and a portable communication device. The portable communication device includes an input/output module to acquire a web-page formatted for one of a first orientation and a second orientation on the display screen of the portable communication device from the rendering platform, a representation module for representing the audiovisual content of the web-page in a tree structure, a determination module configured to determine page information for the first orientation and the second orientation of the display screen for the web-page, a restructuring module configured to restructure the audiovisual content on detecting a change in orientation of the portable communication device from one of the first orientation to the second orientation and from the second orientation to the first orientation of the portable communication device based on the determined page information and a displaying module configured to display the restructured audiovisual content on the display screen of the portable communication device. The location of the audiovisual content in the tree structure is retained on restructuring the audiovisual content for providing an uninterrupted display of the audiovisual content on the display screen of the portable communication device.

In an embodiment of the present disclosure, the system further includes a storage module for storing the audiovisual content. In addition, the rendering platform comprises a content acquisition module configured to acquire the web-based content from one or more web-based sources, a device detection module configured to determine a plurality of configuration parameters for the portable communication device, and a transformation module configured to transform the web-based content for each of the one or more portable communication devices based on the determined plurality of configuration parameters for the portable communication device. The page information comprises type of content in the web-page and location of the audiovisual content in the tree structure.

In an embodiment of the present disclosure, the content acquisition module configured to acquire the web-based content from one or more web-based sources comprises acquiring metadata of the web-based content. In addition, the transformation module is configured to apply a one-time transformation on the HTML tags for converting the HTML tags into custom tags.

In yet another embodiment of the present disclosure, a portable communication device is provided. The portable communication device includes one or more processors and a non-transitory memory. The non-transitory memory contains instructions that, when executed by the one or more processors, causes the one or more processors to perform a set of steps. The set of steps includes acquiring a web-page formatted for one of a first orientation and a second orientation on the display screen of the portable communication device from the rendering platform, representing the audiovisual content of the web-page in a tree structure, determining page information for the first orientation and the second orientation of the display screen for the web-page, restructuring the audiovisual content on detecting a change in orientation of the portable communication device from one of the first orientation to the second orientation and from the second orientation to the first orientation of the portable communication device based on the determined page information and displaying the restructured audiovisual content on the display screen of the portable communication device. The location of the audiovisual content in the tree structure is retained on restructuring the audiovisual content for providing an uninterrupted display of the audiovisual content on the display screen of the portable communication device.

In an embodiment of the present disclosure, the non-transitory memory containing instructions that, when executed by the one or more processors, cause the one or more processors to perform a further step of storing the audiovisual content. In addition, the non-transitory memory containing instructions that, when executed by the one or more processors, cause the one or more processors to perform a further step of transmitting a request for acquiring the web-based content to a rendering platform. The rendering platform determines a plurality of configuration parameters for the portable communication device, transforms the web-based content for the portable communication device and acquires and stores HTML tags as metadata for the web-based content.

BRIEF DESCRIPTION OF THE FIGURES

Having thus described the invention in general terms, reference will now be made to the accompanying drawings, which are not necessarily drawn to scale, and wherein:

DETAILED DESCRIPTION

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Figure 1:
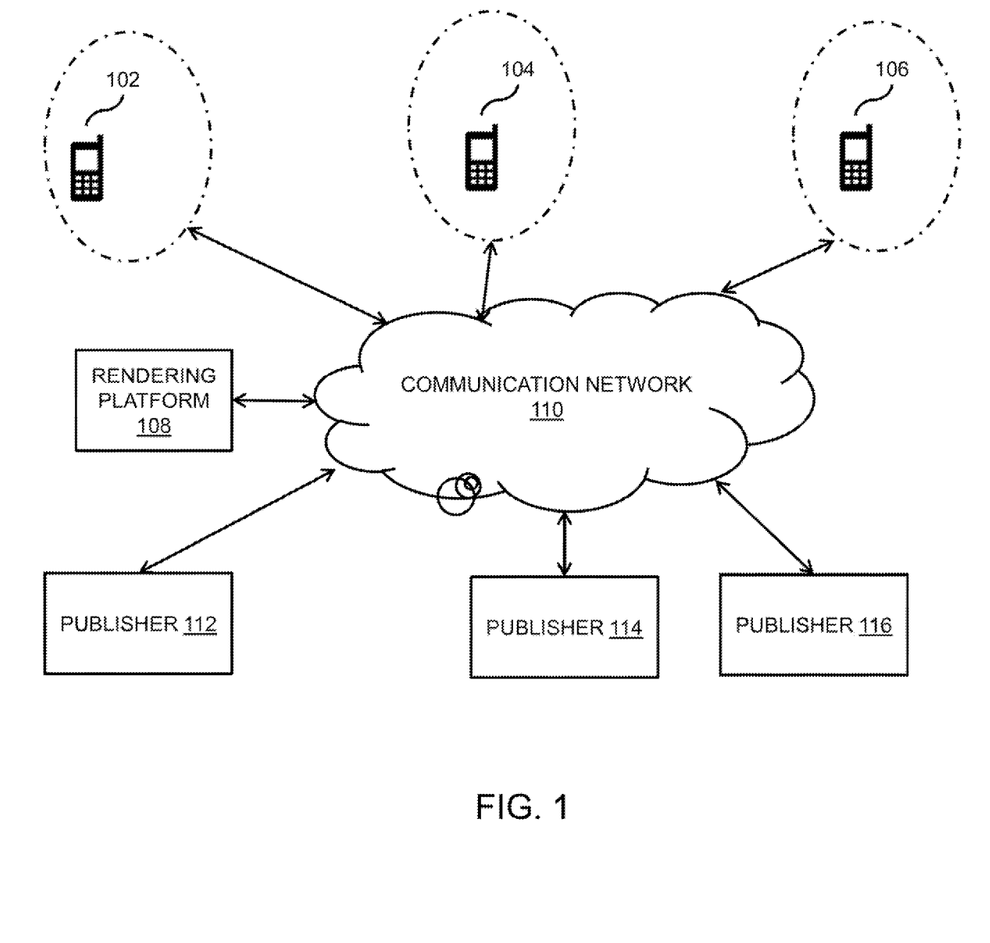
FIG. 1 illustrates a system for managing display of web-based content, in accordance with various embodiments of the present disclosure.

FIG. 1 illustrates a system 100 for managing display of web-based content, in accordance with various embodiments of the present disclosure. The system 100 includes one or more portable communication devices 102-106, a rendering platform 108 and one or more publishers 112-116. Each of the portable communication devices 102-106 access the web-based content provided by one or more online publishers 112-116 (say websites) through the communication network 110. The term 'web-based content' refers to contents of a web page. The web page refers to information resource that can be accessed through a web browser and displayed on each of the portable communication devices 102-106. The web page comprises different type of information which includes but may not be limited to audio information, video information, and images. The portable communication device 102 (or the portable communication device 104 or the portable communication device 106) refers to a handheld electronic device that can be used to access the web page on the Internet. Example of the portable communication device 102 include but may not be limited to a cell phone, a smart phone, a personal digital assistant (PDA), a wireless email terminal, a laptop, and a tablet computer. Examples of the communication network 110 can be a local area network, a wide area network, a wireless network, and a telecommunication network. Example of the telecommunication network 110 can be a global system for mobile communications (GSM) network, a general packet radio service (GPRS) network, a code division multiple access (CDMA) system, enhanced data GSM environment (EDGE), wideband CDMA (WCDMA), and the like. In addition, each of the publishers 112-116 may be a source of providing content through web-pages. It may be noted that each of the publishers 112-116 refers to a website that hosts web pages comprising the web-based content and having an association.

In an embodiment of the present disclosure, each of the publishers 112-116 is associated with the rendering platform 108. For example, the publisher 112 registers with the rendering platform 108 to provide the web-based content to one or more portable communication devices 102-106 via the rendering platform 108.

Figure 2:
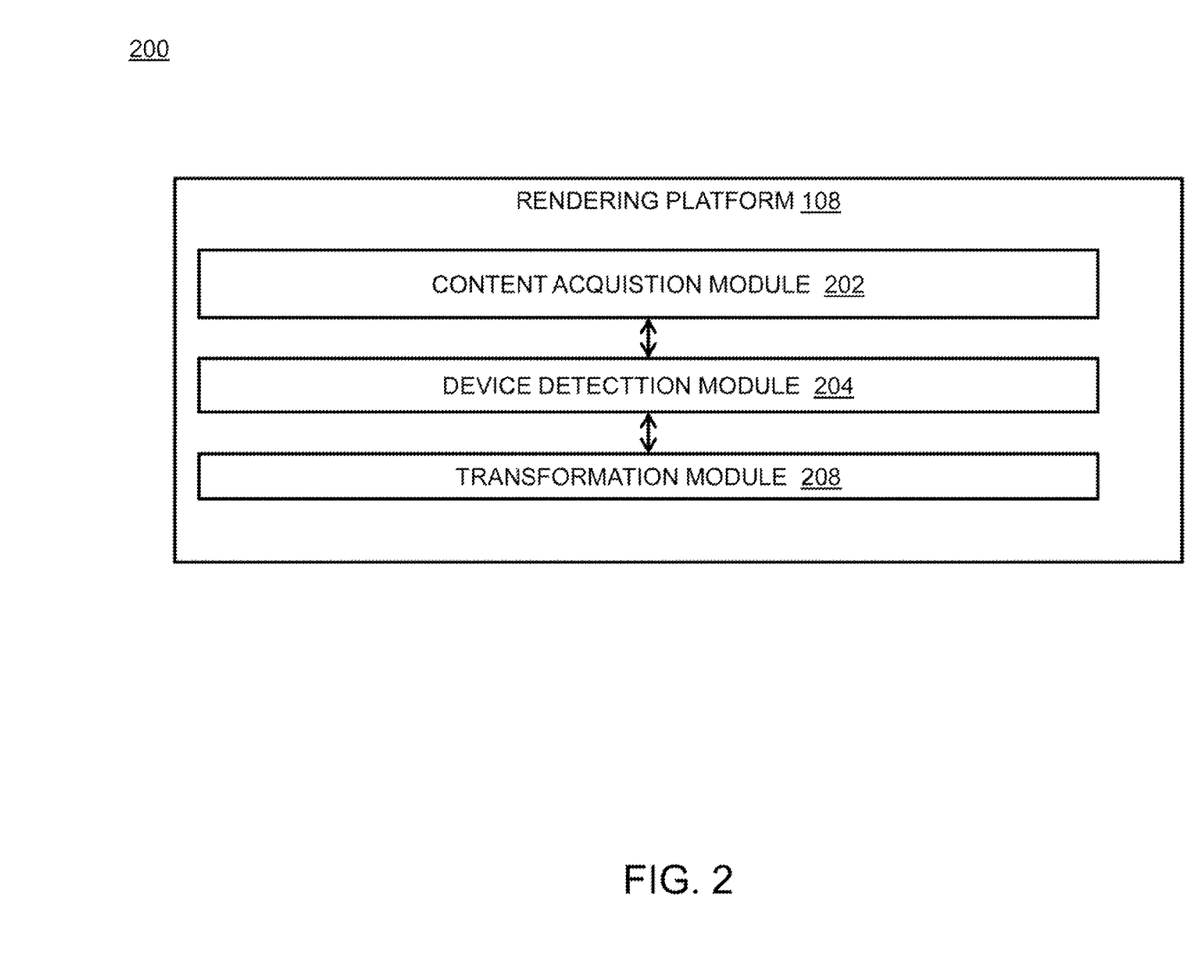
FIG. 2 illustrates a block diagram of a rendering platform, in accordance with various embodiments of the present disclosure.

FIG. 2 illustrates a block diagram 200 of the rendering platform 108, in accordance with various embodiments of the present disclosure. The rendering platform 108 includes a content acquisition module 202, a device detection module 204 and a transformation module 206. The content acquisition module 202 acquires the web-based content from one or more publishers 112-16. The acquired web-based content includes metadata. In an embodiment of the present disclosure, the metadata is in the form of HyperText Markup Language (HTML) tags. HTML refers to a markup language for displaying web pages and other information in a web browser. HTML is written in the form of HTML elements that comprise the HTML tags.

In an embodiment of the present disclosure, the rendering platform 108 stores the HTML tags of the web-based content in a database in a device-independent manner and process these HTML tags. In an embodiment of the present disclosure, the rendering platform 108 applies a one-time transformation on the HTML tags for converting the HTML tags into custom tags. The custom tags stores the values of the metadata in the form of variables.

In an embodiment of the present disclosure, the rendering platform 108 receives a request for web content from the portable communication device 102. The device detection module 204 determines display capability of the portable communication device 102. The term "display capability" refers to the software and hardware attributes of the display of the portable communication device 102. Examples of the attributes include but may not be limited to form factor, characteristics, features, device attributes, and browsing entity attributes of the portable communication device 102. In addition, the term "form factor" refers to the physical dimensions of the portable communication device 102 which include but not limited to height, width, and screen size. Examples of the device attributes include but may not be limited to the script execution capabilities and multimedia handling capabilities.

In an embodiment of the present disclosure, the rendering platform 108 transforms the web-based content based on the device capability of the portable communication device 102. The transformation can be dynamic transformation. The transformation includes but may not be limited to image resizing and custom video players. In an embodiment of the present disclosure, the rendering platform 108 takes decisions about the inclusion and/or exclusion of the web-based content as per the device capabilities of the portable communication device 102. For example, an HTML tag is <img src="smiley.gif" alt="Smiley face" height="42" width="42">. The rendering platform 108 applies a transformation to convert this HTML tag into a custom tag:<img src="smiley.gif" alt="Smiley face" height="x" width="y">. On receiving a request for the web content and determining the device capabilities of the portable communication device 102, the rendering platform 108 transforms the web content as <img src="smiley.gif" alt="Smiley face" height="32" width="32">.

It may be noted that various system elements of the rendering platform 108 has been explained by considering the portable communication device 102 into account; however, those skilled in the art would appreciate that rendering platform 108 may display similar functionalities when each of one or more portable communication devices 102-106 are considered.

Figure 3:
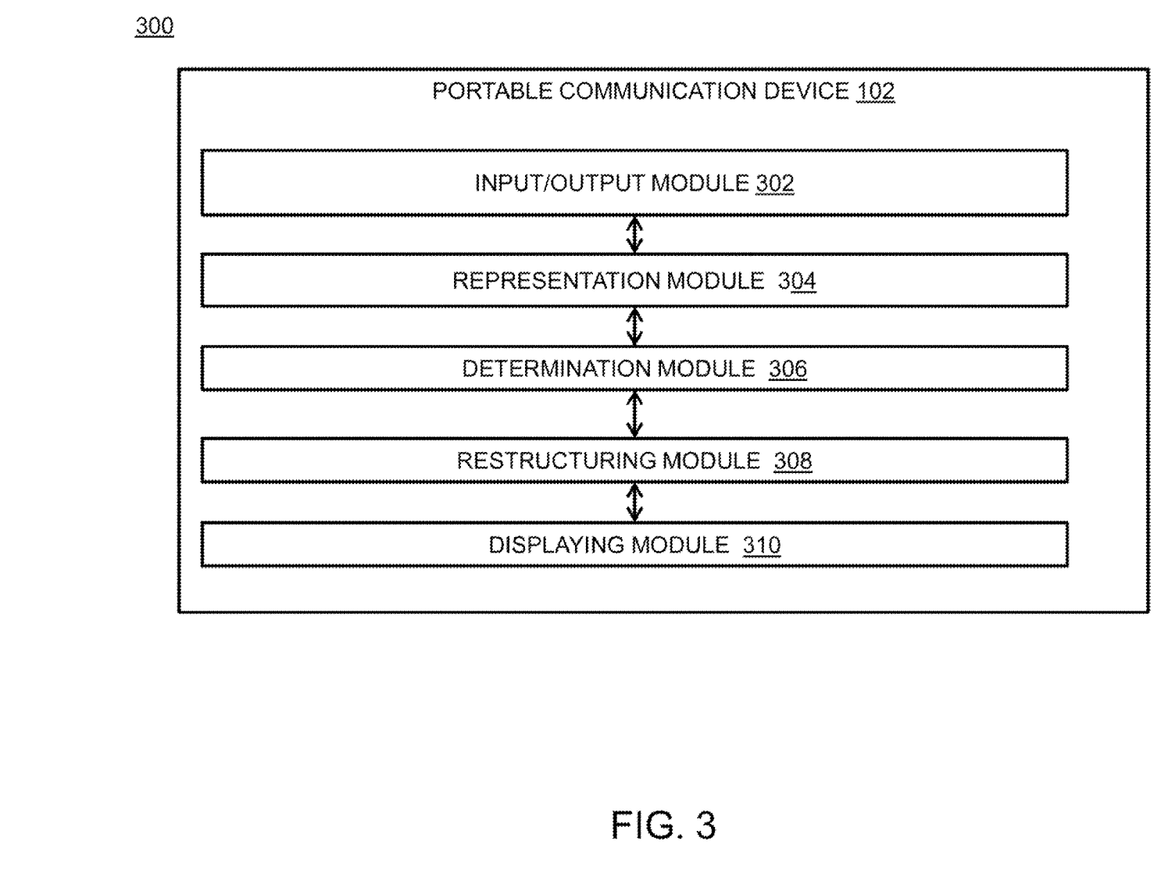
FIG. 3 illustrates a block diagram of a portable communication device for restructuring audiovisual content of a web page on a display screen of the portable communication device, in accordance with various embodiments of the present disclosure.

FIG. 3 illustrates a block diagram 300 of the portable communication device 102 for restructuring audiovisual content of a web page on a display screen of the portable communication device 102, in accordance with various embodiments of the present disclosure. It may be noted that references will be made to various system elements shown in FIG. 1 and FIG. 2 to explain functioning of various system elements of FIG. 3.

The portable communication device 102 includes an input/output module 302, a representation module 304, a determination module 306, a restructuring module 308, and a displaying module 310. The input/output module 302 receives/acquires the web page comprising the audiovisual content from a web server. The web pages refer to information resource that can be accessed through a web browser and displayed on the portable communication device 102. It may be noted that the terms web page, web-based content or web content are interchangeably used in the present application. All these terms refers to the information present on Internet in the form of websites/web pages.

In an embodiment of the present disclosure, the input/output module 302 acquires the web page comprising the audiovisual content from the rendering platform 108. In another embodiment of the present disclosure, the input/output module 302 acquires the web page comprising the audiovisual content from one or more publishers 112-116. In an example, the audiovisual content on the web page may be accessed by a user by flipping or swiping across the display screen of the portable communication device 102. In an embodiment of the present disclosure, the input/output module 302 acquires the web page by using a web browser of the portable communication device 102. The term "web browser" refers to a software application for retrieving, presenting, and accessing the web content on the World Wide Web on the portable communication device 102. A request for the web page can be sent from the portable communication device 102 by typing a uniform resource locator (URL) of the desired website on the web browser of the portable communication device 102.

Generally, the web page is formatted for one of a first orientation and a second orientation on the display screen of the portable communication device 102. The first orientation is a portrait orientation and the second orientation is a landscape orientation. The term "portrait orientation" refers to an orientation in which the length of the display screen is vertically oriented. The display screen in the portrait orientation of the portable communication device 102 is taller than it is wide. The term "landscape orientation" refers to an orientation in which the length of the display screen is horizontally oriented. The display screen in the landscape orientation of the portable communication device 102 is wider than it is tall.

The representation module 304 represents the audiovisual content of the web page in a tree structure. In an embodiment of the present disclosure, the tree-structure can be a Document Object Model (DOM). The DOM refers to a model that describes how all the multimedia objects in the web page are related to each other. The DOM enables accessing, interacting with, and modification of the multimedia objects in the web page.

The determination module 306 determines page information for the first orientation and the second orientation of the display screen for the web page. Examples of the page information include but may not be limited to type of content in the web page, location of the audiovisual content in the tree structure and layout of the web page. The type of content can be text type content, audiovisual content, content in image form, and the like. The term 'layout' as described refers to the representation of the various contents, on the web page. In an example, a web page comprising the audiovisual content is rendered in the landscape orientation. The portable communication device 102 stores the audiovisual content and represents the audiovisual content of the web page in a tree structure. The page information for this web page in landscape orientation comprises of the layout of the web page, the type of content as indicated by a string "type" followed by the content type. For example, the page information for the audiovisual content is stored as "type: video file". Further, a reference to the location of the audiovisual content is stored in the tree structure.

The restructuring module 308 restructures the audiovisual content on detecting a change in orientation of the portable communication device 102 from the first orientation to the second orientation or from the second orientation to the first orientation of the portable communication device 102 based on the determined page information. The displaying module 310 displays the restructured audiovisual content on the display screen on the portable communication device 102. The location of the audiovisual content in the tree structure is retained on restructuring the audiovisual content for providing an uninterrupted display of the audiovisual content on the display screen of the portable communication device 102.

It may be noted that to explain FIG. 3, the portable communication device 102 has been taken as an example; however, those skilled in the art would appreciate that the portable communication device 104 and the portable communication device 104 has the same system elements and has same functionalities.

Figure 4:
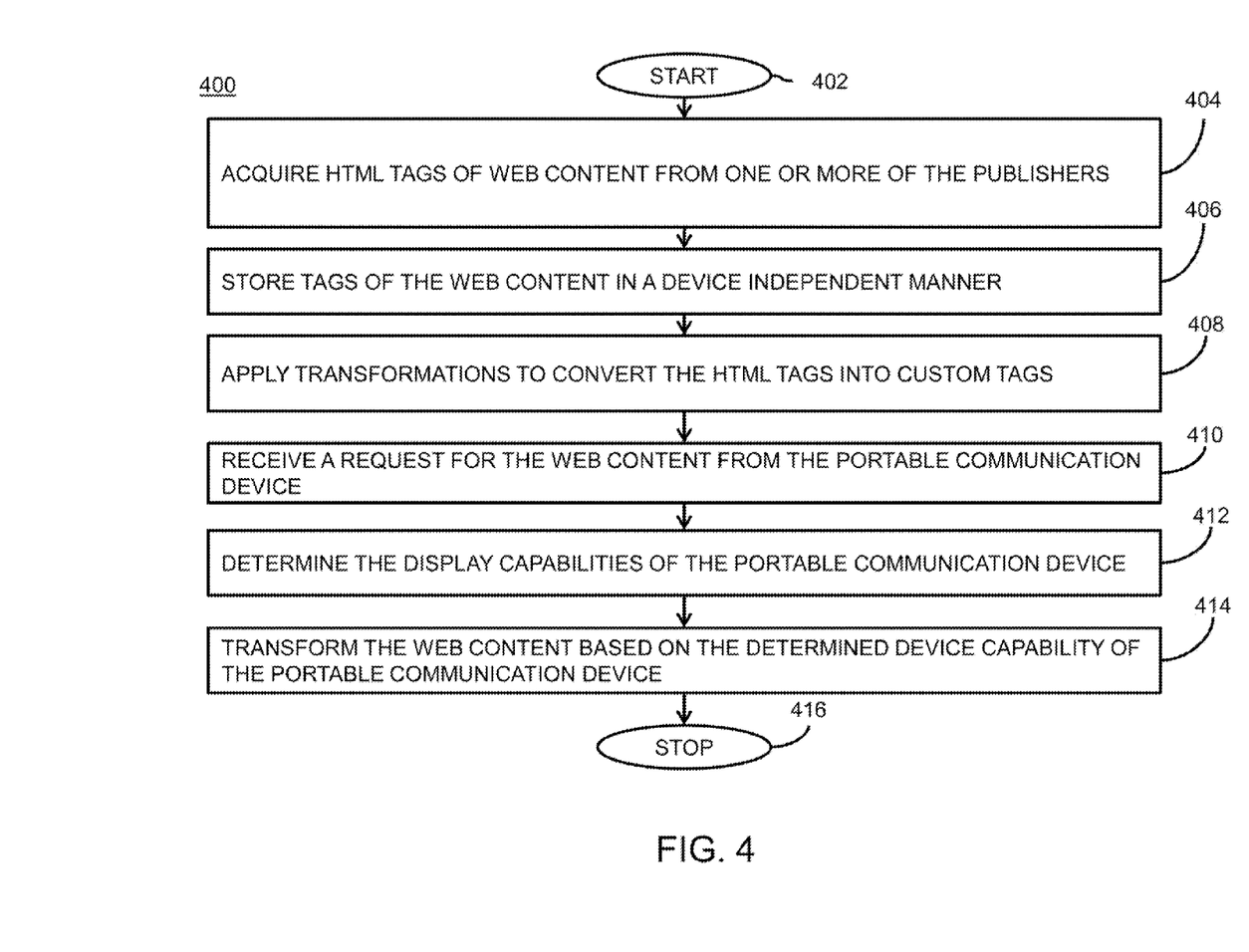
FIG. 4 illustrates a flowchart for managing display of web-based content on one or more portable communication devices, in accordance with various embodiments of the present disclosure.

FIG. 4 illustrates a flowchart 400 for managing display of web-based content on one or more portable communication devices 102-106, in accordance with various embodiments of the present disclosure. It may be noted that references will be made to various system elements of FIG. 1, FIG. 2 and FIG. 3.

The flowchart 400 initiates at step 402. At step 404, the rendering platform 108 acquires HTML tags of web content from one or more of the publishers 112-116. As mentioned above, at step 406, the rendering platform 108 store tags of the web content in a device independent manner. Following step 406, at step 408, the rendering platform 108 applies transformations to convert the HTML tags into custom tags. At step 410, the rendering platform 108 receives a request for the web content from the portable communication device 102. At step 412, the rendering platform 108 determines the display capabilities of the portable communication device 102. At step 414, the rendering platform 108 transforms the web content based on the determined device capability of the portable communication device 102. The flowchart 400 terminates at step 416.

Figure 5:
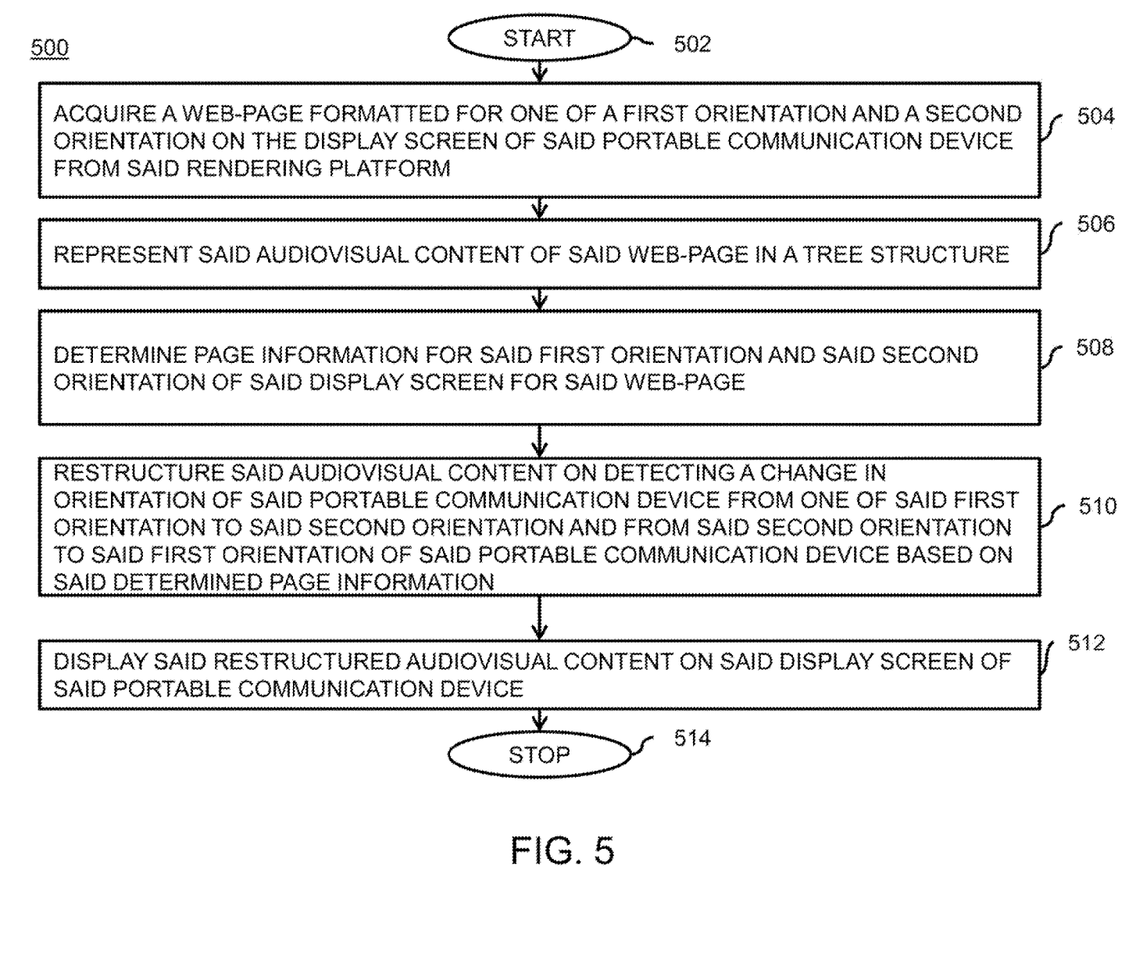
FIG. 5 illustrates a flowchart for restructuring audiovisual content of the web page on a display screen of the portable communication device, in accordance with various embodiments of the present disclosure.

FIG. 5 illustrates a flowchart 500 for restructuring audiovisual content of the web page on a display screen of the portable communication device 102, in accordance with various embodiments of the present disclosure. The flowchart 500 initiates at step 502. At step 504, the portable communication device 102 acquires the web page comprising the audiovisual content from a web server. At step 504, the portable communication device 102 represents the audiovisual content of the web page in a tree structure. Following step 504, at step 506, the portable communication device 102 determines page information for the first orientation and the second orientation of the display screen for the web page. At step 508, the portable communication device 102 restructures the audiovisual content on detecting a change in orientation of the portable communication device 102 from the first orientation to the second orientation or from the second orientation to the first orientation of the portable communication device 102 based on the determined page information. At step 510, the portable communication device 102 displays the restructured audiovisual content on the display screen. The flowchart 500 terminates at step 514.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A system for managing display of web-based content on one or more portable communication devices, said system comprising:
   a content acquirer configured to acquire said web-based content from one or more web-based sources and to acquire and store metadata of said web-based content, said metadata comprising HTML tags;
   a device detector configured to determine a plurality of configuration parameters for each of said one or more portable communication devices, wherein each of said one more portable communication devices sends a request to said one or more web-based sources to access web-based content; and
   a transformer configured to transform said web-based content for each of said one or more portable communication devices based on said determined plurality of configuration parameters for each of said one or more portable communication devices;

wherein each of said one or more portable communication devices is configured to acquire said web-based content comprising audiovisual content;
wherein said web-based content is formatted for one of a first orientation and a second orientation on a display screen of each of said one or more portable communication devices;
each of said one or more portable communication devices being configured to:
represent said audiovisual content of said web-based content in a tree structure;
determine page information for said first orientation and said second orientation of said display screen for said web-based content, wherein said page information comprises types of content in said web-based content and location of said audiovisual content in said tree structure;
restructure said audiovisual content on detecting a change in orientation from one of the first orientation to the second orientation and from the second orientation to the first orientation based on said determined page information; and
display said restructured audiovisual content;
wherein said tree structure is a model describing how all multimedia objects in the web content are related to each other and stores a reference to a location of the audiovisual content, wherein said location of said audiovisual content stored in said tree structure is retained on restructuring said audiovisual content for providing an uninterrupted display of said audiovisual content on said corresponding display screen of each of said one or more portable communication devices;
wherein said transformer is configured to apply a one-time transformation on said HTML tags for converting said HTML tags into custom tags, wherein values of the metadata are converted into variables, said transformer being configured to substitute new values for the variables as part of transforming said web-based content.

2. A system comprising:
a rendering platform; and
a portable communication device, wherein said portable communication device comprises
an input/output configured to acquire a web-page formatted for one of a first orientation and a second orientation on a display screen of said portable communication device from said rendering platform and to acquire and store metadata of said web-page, said metadata comprising HTML tags;
a representor for representing audiovisual content of said web-page in a tree structure;
a determiner configured to determine page information for said first orientation and said second orientation of said display screen for said web-page, wherein said page information comprises type of content in said web-page and location of said audiovisual content in said tree structure;
a restrictor configured to restructure said audiovisual content on detecting a change in orientation of said portable communication device from one of said first orientation to said second orientation and from said second orientation to said first orientation of said portable communication device based on said determined page information, said restructuring comprising applying a one-time transformation on said HTML tags for converting said HTML tags into custom tags, wherein values of the metadata are converted into variables, and substituting new values for the variables; and
a displayer configured to display said restructured audiovisual content on said display screen of said portable communication device;
wherein said tree structure is a model describing how all multimedia objects in the audiovisual content are related to each other and stores a reference to a location of the audiovisual content, wherein said location of said audiovisual content stored in said tree structure is retained on restructuring said audiovisual content for providing an uninterrupted display of the audiovisual content on said display screen of said portable communication device.

3. The system as recited in claim 2, further comprising storage for storing said audiovisual content.

4. The system as recited in claim 2, wherein said rendering platform comprises:
a content acquirer configured to acquire said audiovisual content from one or more web-based sources;
a device detector configured to determine a plurality of configuration parameters for said portable communication device, wherein said portable communication device sends a request to said one or more web-based sources to access audiovisual content; and
a transformer configured to transform said audiovisual content for each of said one or more portable communication devices based on said determined plurality of configuration parameters for said portable communication device.

5. A portable communication device comprising:
one or more processors; and
a non-transitory memory containing instructions that, when executed by said one or more processors, causes said one or more processors to perform a set of steps, said set of steps comprising:
acquiring a web-page formatted for one of a first orientation and a second orientation on a display screen of said portable communication device from a rendering platform and acquiring and storing metadata of said web-page, said metadata comprising HTML tags;
representing audiovisual content of said web-page in a tree structure;
determining page information for said first orientation and said second orientation of said display screen for said web-page, wherein said page information comprises type of content in said web-page and location of said audiovisual content in said tree structure;
restructuring said audiovisual content on detecting a change in orientation of said portable communication device from one of said first orientation to said second orientation and from said second orientation to said first orientation of said portable communication device based on said determined page information, said restructuring comprising applying a one-time transformation on said HTML tags for converting said HTML tags into custom tags, wherein values of the metadata are converted into variables, and substituting new values for the variables as part of transforming said web-page; and
displaying said restructured audiovisual content on said display screen of said portable communication device;
wherein said tree structure is a model describing how all multimedia objects in the web content are related to each other and stores a reference to a location of the audiovisual content, wherein said location of said audiovisual content stored in said tree structure is retained on restructuring said audiovisual content for providing an uninterrupted display of the audiovisual content on said display screen of said portable communication device.

6. The portable communication device as recited in claim 5, wherein said non-transitory memory containing instructions that, when executed by said one or more processors, cause said one or more processors to perform a further step of storing said audiovisual content.

7. The portable communication device as recited in claim 5, wherein said non-transitory memory containing instructions that, when executed by said one or more processors, cause said one or more processors to perform a further step of transmitting a request for acquiring said web-based content to a rendering platform.

8. The portable communication device as recited in claim 7, wherein said non-transitory memory containing instructions that, when executed by said one or more processors, cause said one or more processors to perform said further step of transmitting a request for acquiring said web-based content to said rendering platform, wherein said rendering platform determines a plurality of configuration parameters for said portable communication device.

9. The portable communication device as recited in claim 8, wherein said non-transitory memory containing instructions that, when executed by said one or more processors, cause said one or more processors to perform said further step of transmitting a request for acquiring said web-based content to said rendering platform, wherein said rendering platform transforms said web-based content for said portable communication device.

10. The portable communication device as recited in claim 9, wherein said non-transitory memory containing instructions that, when executed by said one or more processors, cause said one or more processors to perform said further step of transmitting a request for acquiring said web-based content to said rendering platform, wherein said rendering platform acquires and stores the HTML tags as metadata for said web-based content.

11. The portable communication device as recited in claim 9, wherein said non-transitory memory containing instructions that, when executed by said one or more processors, cause said one or more processors to perform said further step of transmitting a request for acquiring said web-based content to said rendering platform, wherein said rendering platform applies the one-time transformation on said HTML tags for converting said HTML tags into custom tags.

* * * * *